US007373545B2

(12) United States Patent
Leveille et al.

(10) Patent No.: US 7,373,545 B2
(45) Date of Patent: May 13, 2008

(54) FAULT TOLERANT COMPUTER SYSTEM

(75) Inventors: Paul A. Leveille, Grafton, MA (US); Satoshi Watanabe, Tokyo (JP); Keiichi Koyama, Tokyo (JP)

(73) Assignee: Marathon Technologies Corporation, Littleton, MA (US)

( * ) Notice: Subject to any disclaimer, the term of this patent is extended or adjusted under 35 U.S.C. 154(b) by 0 days.

(21) Appl. No.: 11/382,133

(22) Filed: May 8, 2006

(65) Prior Publication Data

US 2006/0253727 A1 Nov. 9, 2006

Related U.S. Application Data

(60) Provisional application No. 60/678,167, filed on May 6, 2005.

(51) Int. Cl.
*G06F 11/00* (2006.01)
(52) U.S. Cl. ........................................................ 714/4
(58) Field of Classification Search ..................... 714/4
See application file for complete search history.

(56) References Cited

U.S. PATENT DOCUMENTS 5,999,712 A * 12/1999 Moiin et al. ................ 709/220
6,021,508 A * 2/2000 Schmuck et al. .............. 714/4
6,105,099 A * 8/2000 Freitas et al. ............... 710/200
6,449,734 B1 * 9/2002 Shrivastava et al. .......... 714/15
6,453,426 B1 * 9/2002 Gamache et al. .............. 714/4
6,785,678 B2 * 8/2004 Price ............................ 707/8
2003/0023680 A1 * 1/2003 Shirriff ....................... 709/204
2005/0262382 A1 * 11/2005 Bain ............................. 714/4
2005/0283641 A1 * 12/2005 Clark et al. .................... 714/4
2006/0090095 A1 * 4/2006 Massa et al. ................... 714/4
2006/0100981 A1 * 5/2006 Jones et al. .................... 707/1
2006/0168256 A1 * 7/2006 Fuente et al. ............... 709/229
2006/0253504 A1 * 11/2006 Lee et al. ................... 707/203

* cited by examiner

*Primary Examiner*—Bryce P Bonzo
(74) *Attorney, Agent, or Firm*—Fish & Richardson P.C.

(57) ABSTRACT

A fault-tolerant computer system includes at least two servers, each of which is configured to perform a first set of operations. Each of the two servers communicate with a computer that does not perform the first set of operations. In the event of a failure of a component of the system, determining which of the servers will continue to perform the first set of operations based on communication with the computer.

22 Claims, 7 Drawing Sheets

CROSS CORRELATED STATE TRANSITION INFORMATION FOR FIGURE 3

| STEP | OPERATION | SERVER 310 | SERVER 320 | QUORUM 330 | QUORUM 340 |
|---|---|---|---|---|---|
| 1 | BOOT SERVERS | 630/-/- | 630/-/- | -/-/- | -/-/- |
| 2 | SERVERS ARBITRATE | 620/-/320 | 660/-/320 | -/-/- | -/-/- |
| 3 | QUORUM BOOTS | 620/-/320 | 660/-/320 | 520/-/- | -/-/- |
| 4 | ELECT QUORUM 330 | 640/330/- | 640/330/- | 530/300/330 | -/-/- |
| 5 | REBOOT QUORUM | 670/330/320 | 670/330/320 | -/-/- | -/-/- |
| 6 | AVOID SPLIT-BRAIN | 620/330/320 | 660/330/320 | 520/-/- | -/-/- |
| 7 | RE-ACQUIRE QUORUM | 640/330/- | 640/330/- | 530/300/330 | -/-/- |
| 8 | LOOSE SERVER 320 | 650/330/310 | -/-/- | 530/300/310 | -/-/- |
| 9 | LOOSE QUORUM | 650/330/310 | -/-/- | -/-/- | -/-/- |
| 10 | REBOOT SERVER 310 | 650/330/310 | -/-/- | -/-/- | -/-/- |
| 11 | REBOOT QUORUM | 650/330/310 | -/-/- | 550/300/310 | -/-/- |
| 12 | SERVER 320 BOOTS | 650/330/310 | 610/330/- | 550/300/310 | -/-/- |
| 13 | SERVER 320 CONNECTS | 660/330/310 | 620/330/310 | 550/300/310 | 520/-/- |
| 14 | ELECT QUORUM 340 | 640/340/- | 640/340/- | 550/300/310 | 530/300/340 |
| 15 | REBOOT BOTH SERVERS | 630/340/- | 630/340/- | 550/300/310 | 520/-/- |
| 16 | LOOSE SERVER 320 | 610/340/- | -/-/- | 550/300/310 | 520/-/- |
| 17 | QUORUM & TIMEOUT | 650/340/310 | -/-/- | 550/300/310 | 550/300/310 |
| 18 | SERVER 320 REBOOTS | 660/340/310 | 620/340/310 | 550/300/310 | 550/300/310 |
| 19 | SERVER 320 RETURNS | 640/340/- | 640/340/- | 550/300/310 | 530/300/340 |
| 20 | AVOID SPLIT-BRAIN | 610/340/320 | 650/340/320 | 550/300/310 | 540/300/320 |
| 21 | RECONNECT | 640/340/- | 640/340/- | 550/300/310 | 530/300/340 |
| 22 | ELECT QUORUM 330 | 640/330/- | 640/330/- | 550/300/330 | 520/-/- |

NOTE: FOR SERVERS 670/330/320 => STATE 670 / QUORUM GUID 330 / TOKEN HOLDER 320
NOTE: FOR QUORUM 550/300/310 => STATE 550 / SYSTEM GUID 300 / TOKEN HOLDER 310
NOTE: SERVER 310 AND SERVER 320 ARE MEMBERS OF SYSTEM GUID 300

FIG. 7

FAULT TOLERANT COMPUTER SYSTEM

CROSS-REFERENCE TO RELATED APPLICATION

This application claims priority to U.S. Provisional Application No. 60/678,167, which was filed on May 6, 2005, and is incorporated by reference.

BACKGROUND

There are many techniques in the computer industry for regulating access to common items. For instance, only one computer at a time can transmit data on a multi-drop communication line. To preserve the integrity of that communication line, some form of access ownership protocol must be run to uniquely select a single master or owner. Depending on the item being regulated, the controlling techniques may include, for example, collision detection, quorums, tokens, lock managers, distributed lock managers, central arbiters, back off timers, round robin scheduling or fixed arbitration.

Similar techniques are used to preserve system integrity in a fault-tolerant system. Fault-tolerance is the ability of a system to achieve desired results in spite of a failure in the system producing the result. To achieve fault-tolerance, either replication-in-time or replication-in-space must be implemented. Replication-in-time refers to reproducing the result at a later time because the original attempt did not succeed due to a failure in the system producing the result. Replication-in-space refers to having duplicate resources available at the time of the failure such that those duplicate resources are able to continue the intended operation and produce the desired result in spite of a failure.

When dealing with a fault-tolerant system that uses replication-in-space techniques, care should be taken to ensure that those duplicate resources do not accidentally operate independently. For example, a fault-tolerant system can be made disaster-tolerant by geographically separating the redundant components such that no single failure event will disable the entire system. Two computers appropriately linked in side-by-side computer racks can be considered disaster tolerant to one rack tipping over or losing power but will not be considered disaster-tolerant to a fire in that room. The farther apart the machines are removed from each other, the more tolerant they become to larger area disasters.

With separation comes the problem of deciding which machine should continue to operate in the event of a loss of communications between them. Both machines continuing to operate without coordination is a condition know as split-brain. Two computers operating on the same problem with the same preconditions but operating in uncoordinated environments may produce different but nonetheless valid results. An example is scheduling airline seats. Given the same map of assigned seats but with reservation requests arriving in different orders due to geographic separation of the computers, the choice of future seat assignments may be different between computers. Each computer's result is valid given its viewpoint of the problem space. As a result, the computers could create valid, but different, local databases that will be impossible to reconcile when communications are restored between the computers. For this reason, split-brain operation is to be avoided.

SUMMARY

In one general aspect, operating a fault-tolerant computer system that includes at least two servers, each of which is configured to perform a first set of operations, includes having each server of the fault tolerant computer system communicate with a computer that does not perform the first set of operations, and, in the event of a failure of a component of the system, determine which of the servers will continue to perform the first set of operations based on communication between at least one of the servers and the computer.

Implementations may include one or more of the following features. For example, determining which of the servers will continue to perform the first set of operations may include having a server that is able to communicate with the computer after the failure of the component of the system continue to perform the first set of operations.

The system also may determine which of the servers will cease performance of the first set of operations in the event of the failure of the component of the system. For example, a server that is unable to communicate with the computer after the failure of the component of the system may cease performance of the first set of operations.

Components of the system may include a first server, a first link between the first server and a network, a second server, and a second link between the second server and the network, and failure of the component of the system may include failure of the first server, the second server, the first link or the second link. Determining which of the servers will continue to perform the first set of operations based on communication with the computer may include avoiding split-brain operation by having the first server continue to perform the first set of operations and having the second server cease performance of the first set of operations in the event of a failure of the second link.

The computer may be connected to the network by a third link, and may be selected by the servers from multiple computers that do not perform the first set of operations. The computer may have a unique identifier, and may be configured to communicate with multiple fault tolerant computer systems, each of which has a unique identifier.

After the servers select the computer that does not perform the first set of operations, the first server may be provided with a token that permits the first server to operate independently of the computer and the second server. Provision of the token may be conditioned on the first server and the second server being able to communicate with each other, as may selection of the computer.

The computer may provide the first server with the token. For example, the computer may determine which of the first server and the second server has a higher level of functionality and provide the first server with the token when the first server has the higher level of functionality. Alternatively, the computer may determine whether the first server and the second server have network connections to the computer, and may provide the first server with the token when the first server has a network connection to the computer and the second server does not have a network connection to the computer.

The details of one or more implementations are set forth in the accompanying drawings and the description below. Other features will be apparent from the description and drawings, and from the claims.

BRIEF DESCRIPTION OF THE DRAWINGS

FIG. 7 provides cross correlated state transition Information for the system of FIG. 3.

DETAILED DESCRIPTION

Figure 1:
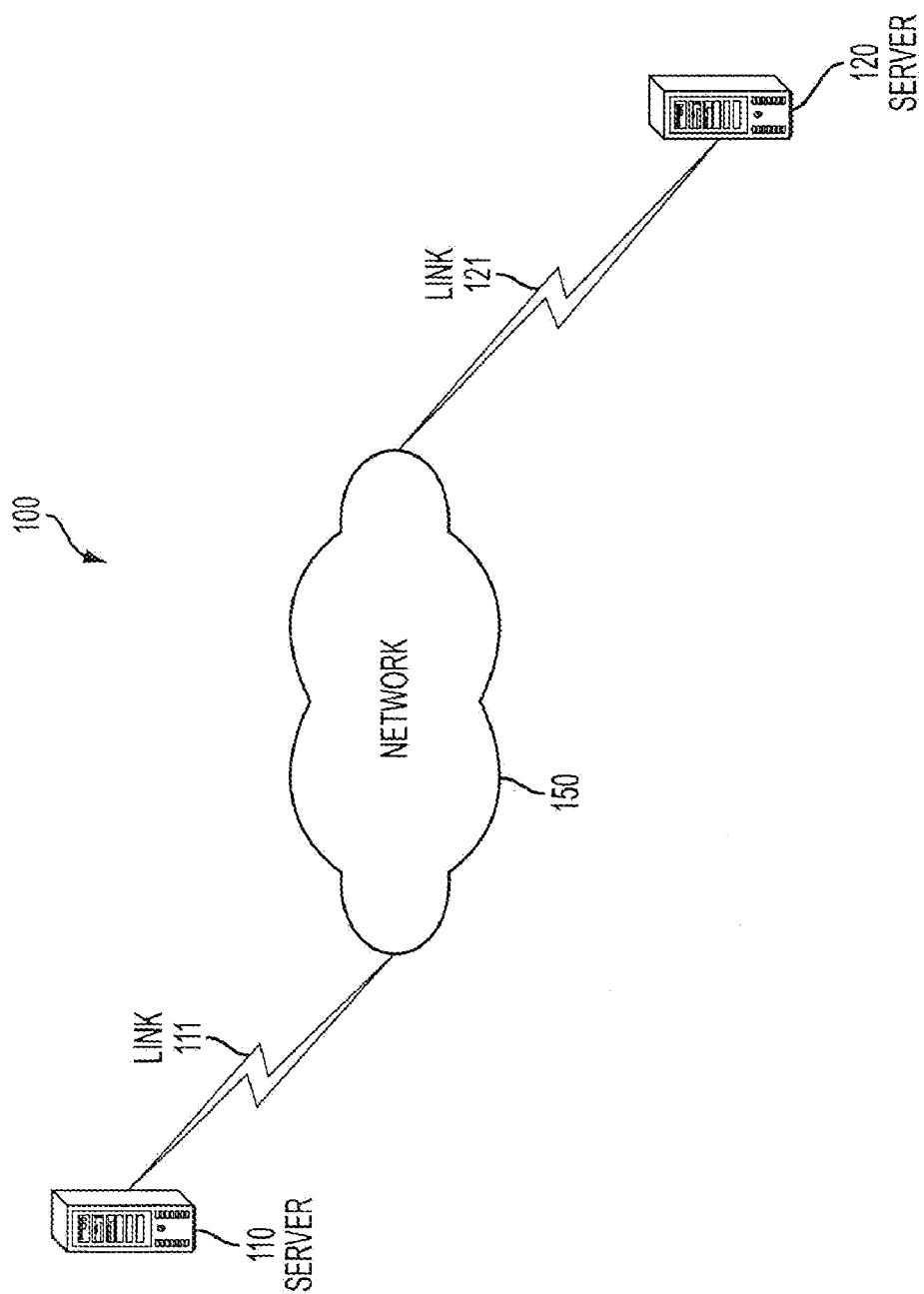
FIG. 1 is a block diagram of a simple fault tolerant computer system.

Referring to FIG. 1, a fault tolerant computer system 100 that is constructed from two network-connected computers is susceptible to a fault condition that isolates the two halves of the computer system. Servers 110 and 120 are two halves of the fully-replicated fault tolerant system 100. Servers 110 and 120 are connected into network 150 through respective links 111 and 121. Each of links 111 and 121 may represent multiple connection links, such as having two or more Ethernet connections into network 150. An example of a single fault condition that can isolate server 110 from server 120 is a backhoe tractor slicing through the wiring trench between buildings that house servers 110 and 120. This produces the potential for a condition known as split-brain. Each of servers 110 and 120 is a complete computer system with no local fault condition that would prevent it from operating. If servers 110 and 120 both continue to operate, they will produce divergent databases that would be impossible to reconcile. To prevent split-brain operation, system 100 must take both servers 110 and 120 offline, or pre-select one server (for example server 110) to continue and take the other server (server 120) offline. Taking both servers offline reduces the availability of the system. Pre-selecting a server assumes that the pre-selected server is still operational after the fault. However, server 110 may not be operational if the backhoe tractor cut the power to the building that houses server 110 when it cut the wiring.

In one example, a server is a computer that is accessible over a network (such as a local area network, a wide area network or the Internet) and provides a service to one or more other computers. In a more particular example, a server may be a computer that is designed to provide a service to a client computer system that is remotely connected to the server over a network. Some servers are dedicated to a particular functions, such as a print server, an electronic mail (e-mail) server, a file server, a data base server, an application server. In such a case, the server is configured with the memory, disk space, one or more application programs, and/or a data base to perform a particular function. A user of a computer who desires to perform the function may connect to the server from a client computer (such as, for example, a laptop, a desktop, or another server) to perform the function. In another example of a server, a computer program performs a service for another program, which may be referred to as a client program. The server program and client program may communicate over an asynchronous or synchronous network connection.

Marathon Technologies of Littleton, Mass. produces a quorum service called Endurance® FT Virtual Server that uses replication-in-space techniques and may be used to implement the fault tolerant system 200 illustrated in FIG. 2 and discussed below.

Figure 2:
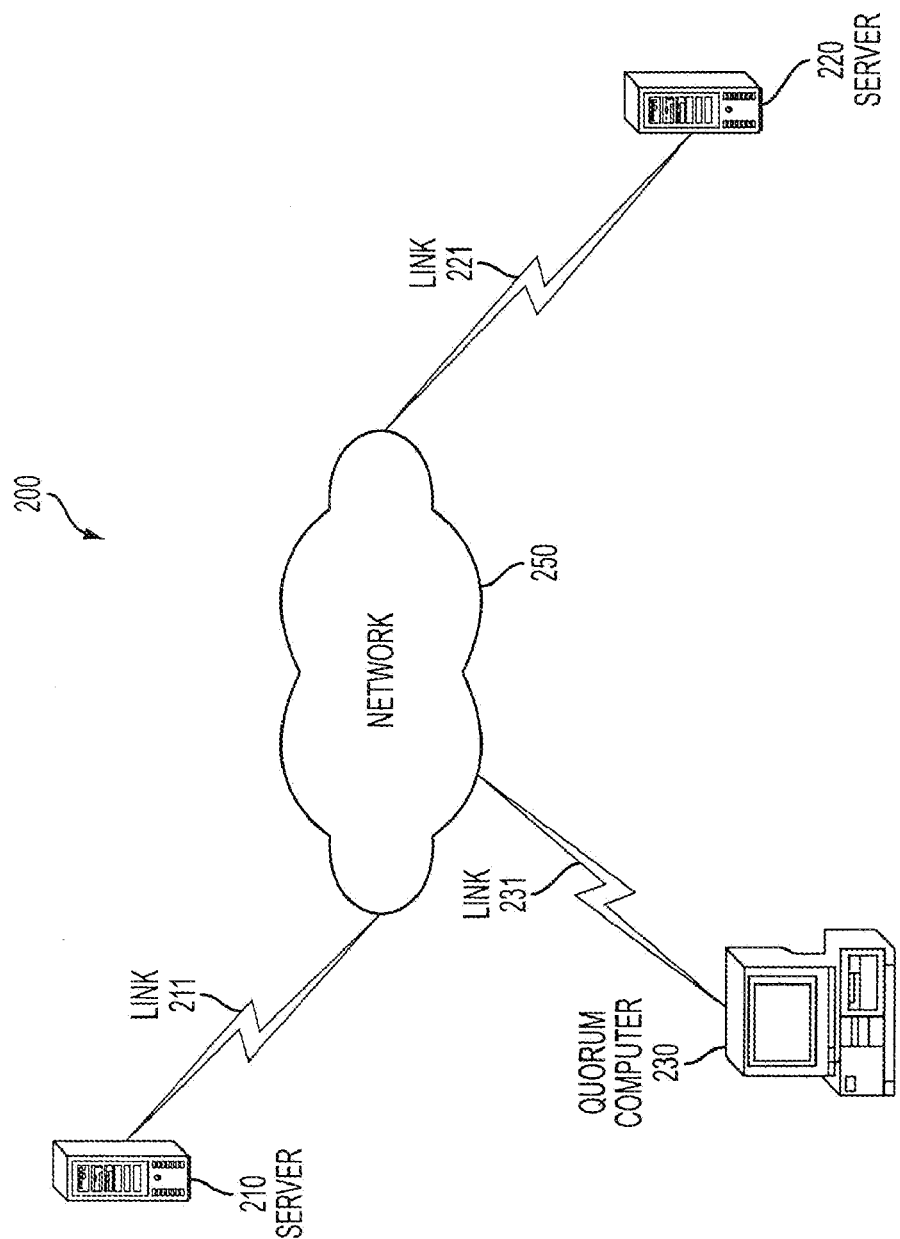
FIG. 2 is a block diagram of a system that includes one quorum computer and a network attached computer system that includes two servers.

FIG. 2 shows a fault tolerant system 200 with the addition of a quorum computer 230. Servers 210 and 220 comprise a fault tolerant computer system interconnected through links 211, 221, and network 250. Quorum computer 230 connects into network 250 through link 231. When no faults are present in the system 200, quorum computer 230 can communicate with both server 210 and server 220. If network 250 is constructed such that no single fault event will break any two of links 211, 221 and 231, then the quorum computer 230 provides a third viewpoint on the fault to avoid split-brain operation. When any link (211, 221, 231) or computer (210, 220, 230) fails, the remaining connected components can resolve how the network is fractured.

For example, a fault in link 211 leaves server 210 isolated with server 220 and quorum computer 230 communicating through link 221, network 250, and link 231. Server 210 knows is it isolated because it can see neither server 220 nor quorum computer 230. Server 220 knows it is not isolated because it can see quorum computer 230.

As another example, a fault in server 210 has no effect on server 220 and quorum computer 230 who can still communicate through link 221, network 250, and link 231. Server 220 knows it is not isolated because it can see quorum computer 230.

The converse cases occur for faults in link 221 and server 220, resulting in server 210 and quorum computer 230 communicating through link 211, network 250, and link 231.

A fault in link 231 or quorum computer 230 results in servers 210 and 220 communicating through link 211, network 250, and link 221. No operational portion of the system was lost. However, with the lack of communications to the quorum computer 230, system 200 is once again susceptible to split-brain operation if another failure occurs. When neither server 210 nor server 220 sees quorum computer 230, a software policy can choose to downgrade the fault-tolerant system (remove either server 220 or server 230 from the system) to avoid split-brain operation until communications to quorum computer 230 are restored.

A quorum computer can be any computer running the quorum protocol. Since the function of the quorum computer is to provide additional capabilities to a fault-tolerant system, the quorum computer should preferably be permanently connected into network 250. A laptop computer that is removed from the network every night or a desktop that is powered down every night are not advisable choices for quorum computers.

Figure 3:
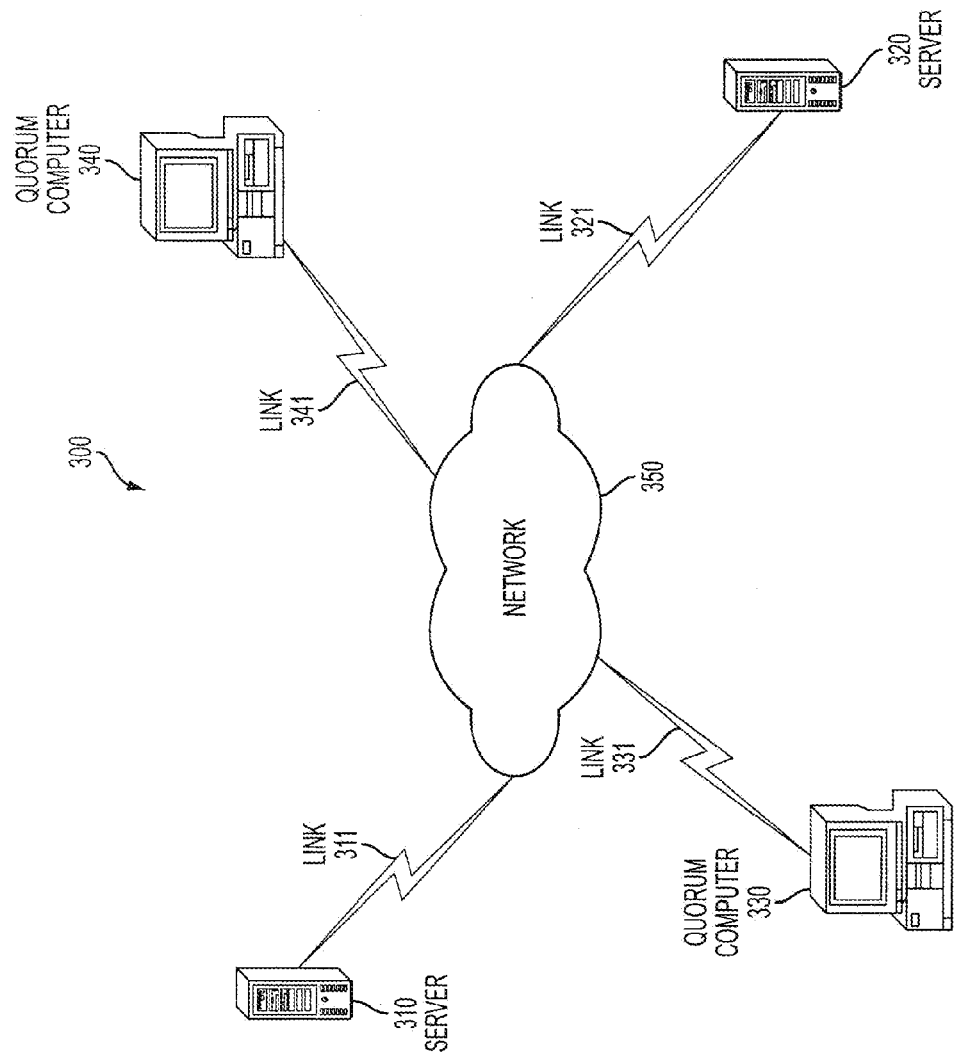
FIG. 3 is a block diagram of a system that includes two quorum computers and a network attached computer system that includes two servers.

FIG. 3 represents a fault tolerant computer system 300 that has multiple quorum computers (330, 340). Network 350 is connected to server 310 through link 311, to server 320 through link 321, to quorum computer 330 through link 331, and to quorum computer 340 through link 341. A single quorum computer (330) is elected to work with servers 310 and 320 to avoid split-brain operation. In the event that quorum computer 330 is no longer accessible, quorum computer 340 is elected to work with servers 310 and 320 to avoid split-brain operation or the need to downgrade system 300. Since multiple quorum computers are allowed, standard desktop computers can provide continuous quorum service without requiring fault-tolerant quorum computers.

Figure 4:
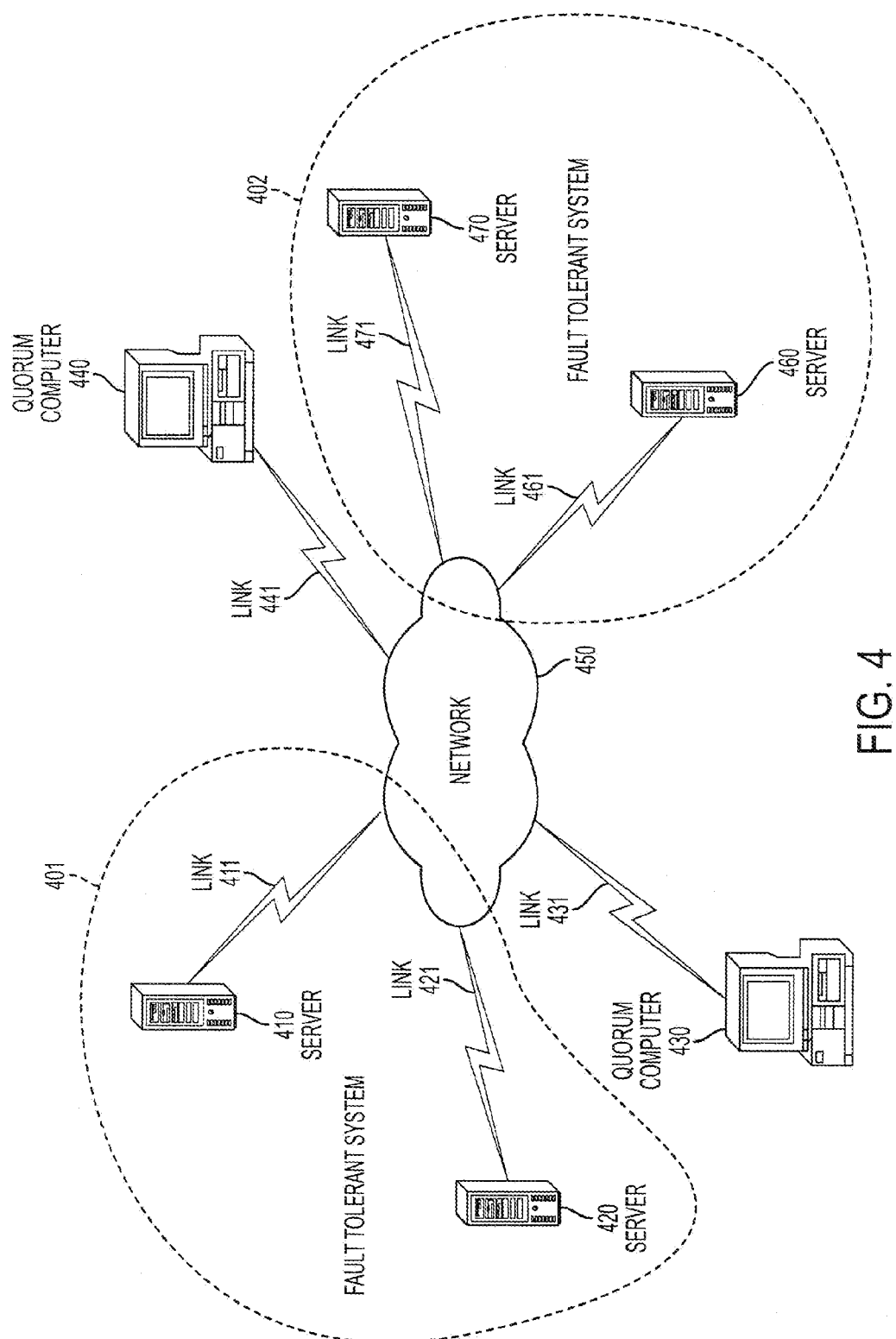
FIG. 4 is a block diagram of a system that includes two quorum computers and two network attached computer systems that each include two servers.

FIG. 4 represents two fault tolerant systems (401 and 402) with two quorum computers (430 and 440). Fault tolerant system 401 includes server 410, link 411, network 450, link 421, and server 420. Fault tolerant system 402 includes server 460, link 461, network 450, link 471, and server 470. Either or both of systems 401 and 402 can use a quorum computer (430 or 440) to avoid split-brain operation. System 401 can use any quorum computer (430, 440) without regard to which quorum computer (430, 440) that system 402 is using.

Detailed Operation of Quorum

For this discussion, a server has three major states: offline, online, and active. Offline means the server is not currently involved in the operation of the fault tolerant system. Online means the server is in communications with the other server in that fault tolerant system and is attempting to become Active. Active means that the server is an operating component of the fault tolerant system.

Each fault tolerant computer system has a software generated globally unique ID (GUID). Thus, in FIG. 4, the GUID for system 401 is unique from the GUID for system 402. A single quorum computer may be in use by multiple fault tolerant systems, and is said to be elected by those systems. The system GUIDs are paired and used by the quorum computer to identify the fault tolerant systems it is handling or that have elected it. Each quorum computer also has a GUID, giving quorum computer 430 a GUID that is unique from a GUID for quorum computer 440. The quorum computer GUID is used by the fault tolerant system to identify which quorum computer it has elected.

A permission or token is created and exchanged between the servers of a fault tolerant system (e.g., servers 410 and 420 of system 401) and the currently-elected quorum computer 430. The computers involved in creating a token each keep a copy of that token. The token indicates which server (410 or 420) is allowed to operate without the presence of the other server (420 or 410). This gives a server the ability to reboot after a power outage or a server restart. The goal is to maximize availability without creating split-brained operation. The rules of operation include the following:

1) A TOKEN is generated when both servers can communicate with each other but not with the quorum computer.

2) A TOKEN may be generated when a server communicates with the elected quorum computer but can not communicate with the other server.

3) A quorum computer can only be elected when both servers can communicate with each other and with the quorum computer.

4) A server with a TOKEN can operate independently.

There are two steady state configurations for system 401. One steady state configuration occurs when server 410, server 420 and elected quorum computer 430 are connected together. The other steady state configuration is when either server 410 or server 420 is running independently with a TOKEN. The system is operating as a fault tolerant system in the first steady state, but not in the second steady stae.

Figure 5:
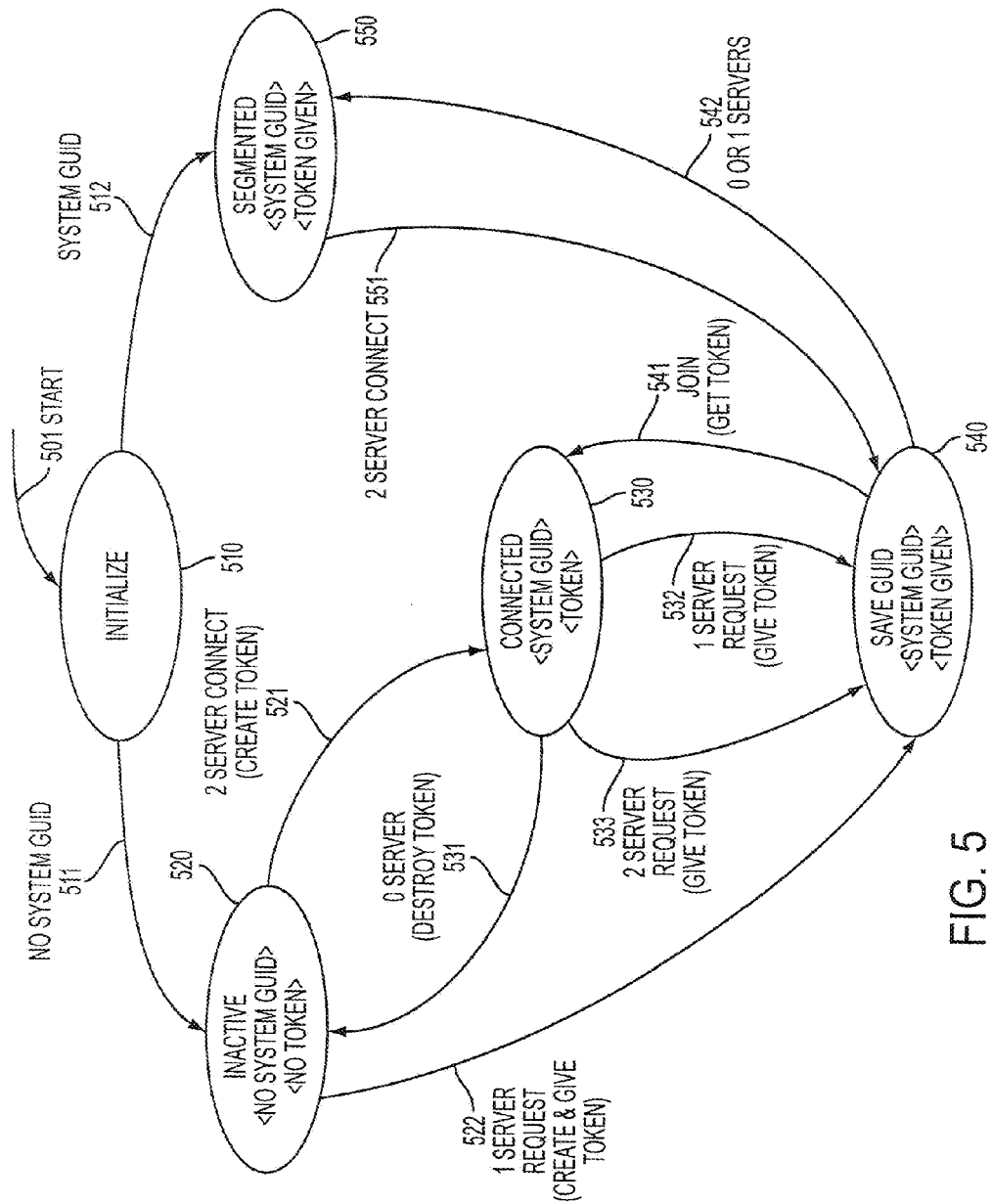
FIG. 5 is a state transition diagram for a quorum computer.

FIG. 5, which is discussed below, represents the state transition diagram for a quorum computer 430 or 440 from FIG. 4, or the quorum computer 230 of FIG. 2.

Figure 6:
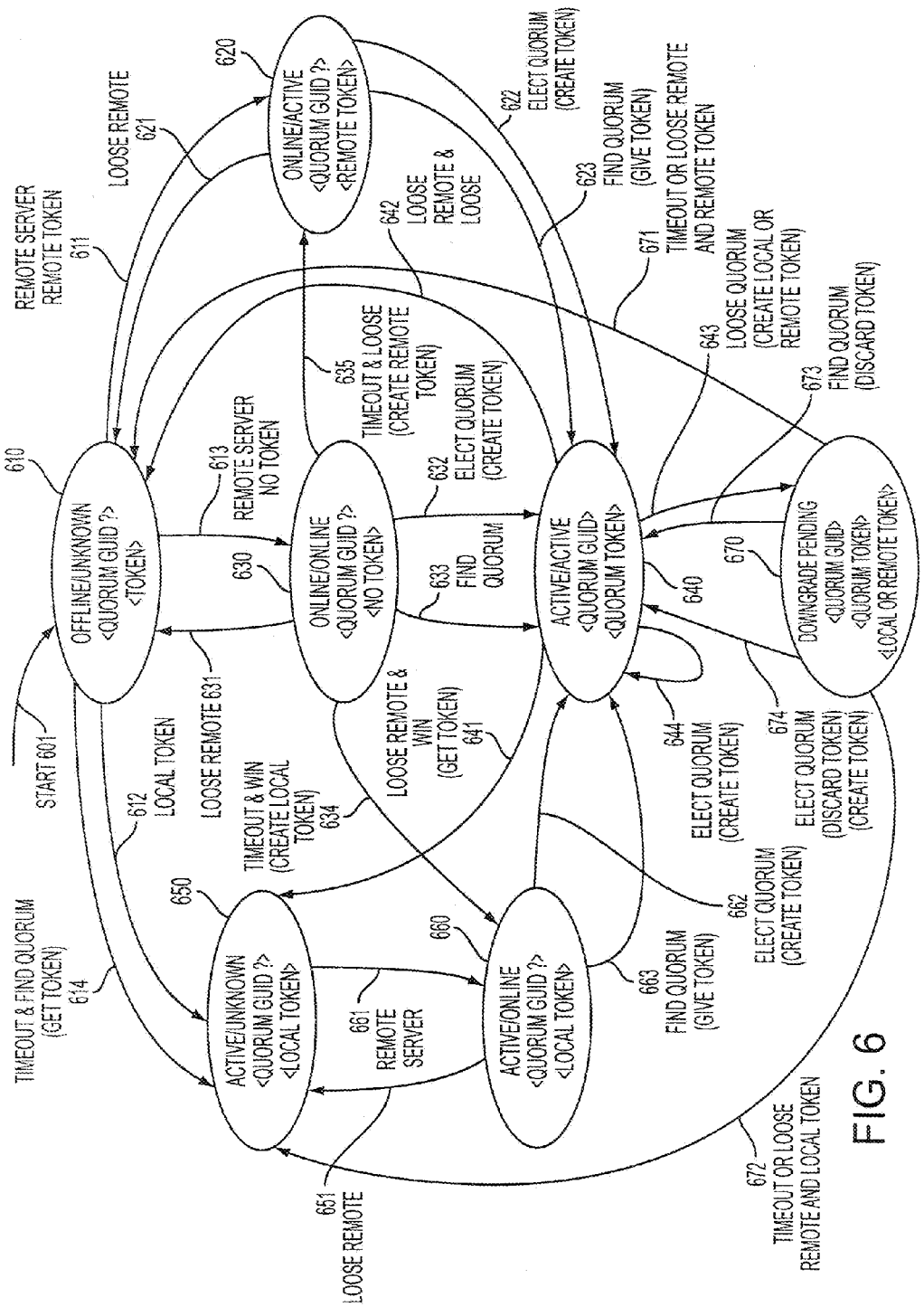
FIG. 6 is a state transition diagram for a server.

FIG. 6 represents a local server state transition diagram and is drawn from the perspective of a server in a fault tolerant system. A server (410 or 420) views itself as "Local" and views the other server (420 or 410) in fault tolerant system 401 as "Remote". When looking at FIG. 6 from the point of view of server 410, "Local" refers to server 410 and "Remote" refers to server 420. When looking at FIG. 6 from the point of view of server 420, "Local" refers to server 420 and "Remote" refers to server 410.

The discussion that follows describes the transitions of the state diagram of FIG. 5 for the quorum computer, and the transitions of the state diagram of FIG. 6 for the servers. The interactions between the state diagrams of FIGS. 5 and 6 are also discussed. Note that a single quorum computer (e.g., 430) can serve multiple fault tolerant systems (e.g., 401 and 402) at the same time. In this case, there would be a different FIG. 5 state transition diagram for each of the systems served by the quorum computer. In addition, a single fault tolerant computer system (e.g., 401) can interact with multiple quorum computers (e.g., 430 and 440).

Each of quorum computers 430 and 440 and fault tolerant systems 401 and 402 is assigned a globally unique identification (GUID). For ease of discussion, the GUIDs are assumed to be Q430 for quorum computer 430, Q440 for quorum computer 440, S401 for fault tolerant system 401, and S402 for fault tolerant system 402.

Referring to FIG. 5 and assuming that there has been no prior connection between fault tolerant system 401 and quorum computer 430, quorum computer 430 boots at transition "Start" 501 and enters the "Initialize" state 510. The Start 501 transition occurs any time the quorum computer starts the quorum service. The Start 501 transition is an implied transition from every state in FIG. 5 that will occur if the quorum computer is rebooted.

If, after Initialize 510, the quorum computer has no knowledge of the current System GUID (i.e., S401) for fault tolerant system 401, transition 511 is taken to "Inactive" 520. Transition 512 is taken to state "Segmented" 550 when the quorum computer has stored the System GUID S401. As discussed below, this means that the TOKEN for that System GUID has been given to one of the servers of system 401, and that server has permission to run independently.

State Inactive 520 represents the condition where the quorum computer has no prior knowledge of the activity of system 401. The default transition, Start 501, returns the quorum computer back to state Initialize 510. Transition 521 from Inactive 520 to state "Connected" 530 is taken when both servers of system 401 connect to (elect) this quorum computer. A TOKEN is created and held by the quorum computer. Any previous TOKEN held by the servers of system 401 is discarded. The TOKEN is unique to fault tolerant system 401 and the current System GUID. The TOKEN being held by the quorum computer indicates that neither server of System GUID currently holds a TOKEN, and, therefore, that neither server has permission to operate independently.

From Connected 530 there are four possible transitions. The implied Start 501 transition to state Initialize 510 represents the quorum computer restarting the quorum service while it holds the TOKEN. The quorum computer loses all knowledge of TOKEN for System GUID. The servers of fault tolerant system 401 are allowed to reelect this quorum computer or to elect any other quorum computer.

From Connected 530, transition 531 back to state Inactive 520 occurs when quorum computer 430 loses communication to both servers of fault tolerant system 401. This is an implied de-election activity. The transition may have occurred because of a loss of network connectivity to quorum computer 430 or the servers of fault tolerant system 401 may have elected a different quorum computer. All knowledge of the TOKEN and the System GUID for fault tolerant system 401 is destroyed after a suitable timeout interval. This quorum computer 430 no longer maintains information specific to fault tolerant system 401.

From Connected 530, the third transition is 533 to Save GUID 540, where both servers in fault tolerant system 401 are no longer connected to each other but still have access to the quorum computer. Each server in system 401 requests the TOKEN from the quorum computer. This is a split-brain connection. As part of that request, each server provides a scalar value representing the current capabilities of that server. Only one of the servers in fault tolerant system 401 should be allowed to continue operation. The server with the highest scalar value which represents the best selection of current capabilities (e.g., network attachments, available disk drives, memory, or fewest failures) will be issued the TOKEN by the quorum computer. The server with the TOKEN is allowed to continue independent operation.

From Connected 530, the fourth transition is also to state Save GUID 540. One server from fault tolerant system 401 is still connected to the quorum computer and is requesting the TOKEN. That server is given the TOKEN by the quorum computer. The server with the TOKEN is allowed to continue independent operation.

There are two cases of TOKEN distribution that are not covered in the transitions from state 530 Connected. The two servers of system 401 are allowed to create and distribute a TOKEN between them without the use of the quorum computer. This will happen if one or both of the servers 410 and 420 loses the connections to quorum computer 430 but can still communicate between themselves. Server 410 and 420 will directly exchange their capabilities value and create a TOKEN identifying the server that will survive. In FIG. 5, this case is represented in transition 531 to state 520 Inactive. This quorum computer was de-elected.

State Save GUID 540 saves the system GUID S401 and TOKEN information. This information will persist until state Connected 530 is reached again. There are three transitions out of Save GUID 540. The implied transition 501 Start comes right back to state Save GUID 540 through transitions 512 to Segmented 550 and transition 551. The second transition out of Save GUID 540 is transition 541, which happens when communications is re-established between servers of fault tolerant system 401. The TOKEN is given back to the quorum computer and state Connected 530 is entered. The third transition 542 from state Save GUID 540 to state Segmented 550 is taken when communications is lost to one or both of the servers in fault tolerant system 401.

State Segmented 550 represents the quorum computer having given its TOKEN to a server in system 401 to designate that server as having the privilege to boot and/or run independently of the other server in system 401. There are two transitions out of Segmented 550. The implied transition Start 501 returns back to Segmented 550 through state Initialize 510 and transition 512. Transition 512 is taken to state Segmented 550 when the quorum computer has stored the GUID (S401) of fault tolerant system 401. This means that the TOKEN for S401 is outstanding.

The second transition from state Segmented 550 is transition 551 to state Save GUID 540. This transition happens when both servers of fault tolerant system 401 reconnect to the quorum computer.

There is one transition that has not yet been described. From state Inactive 520, transition 522 to state Save GUID 540 is taken when one server connects to this quorum requesting a TOKEN. After a timeout period has expired and the other server of system 401 has not connected, the TOKEN is created and given to that single server to allow it to operate independently. This transition can only occur if this quorum computer is still the elected quorum computer for system 401. In other words, the quorum computer was in state Connected 530 and transition 501 was taken due to a power failure or system reboot or transition 531 was taken due to the loss of a network connection between the quorum computer and system 401. In state Inactive 520, when one server connects to the quorum computer, the quorum computer now knows that it is the elected quorum and starts a timer. When the timer expires, the quorum computer creates a TOKEN and gives it to the connected server. If the other server of system 401 connects before the timeout interval expires, then transition 521 to state Connected 530 will be taken as discussed above.

Note that there is no overt de-elect function. When a quorum computer is de-elected, the servers of fault tolerant system 401 stop conversing with the quorum computer. From any state in the quorum state transition diagram, the "0 server" transition represents a potential de-election. This leaves the quorum computer in either state Inactive 520 or state Segmented 550. In state Inactive 520, the quorum computer has no knowledge of system GUID S401. In state Segmented 550, the quorum computer is holding onto the system GUID and the knowledge of which server last had the TOKEN. If fault tolerant system 401 ever re-elects this quorum computer, transitions 551 and 541 are followed back to state Connected 530 where the stale TOKEN information is cleaned up. The servers of fault tolerant system 401 track the quorum GUID of the current quorum computer and ignore any TOKEN information held by any other quorum computer. Thus, the stale TOKEN information in a quorum computer has no adverse affect.

Referring to FIG. 6, the state transitions relative to a server are described. The implied transition is Start 601, which leads into state Offline/Unknown 610. In most cases, the state name chosen gives the condition of the local server (Offline) followed by the condition of the remote server (Unknown). The first time a server is activated, there is no elected quorum computer; therefore, the quorum GUID is not found. There also is no TOKEN. From state Offline/Unknown 610, there is only one useable transition 613 to state Online/Online 630 when the remote server is detected.

From state Online/Online 630, transition Start 601 represents the reboot of the local server. Transition 631 represents the reboot of the remote server. In either case, state Offline/Unknown 610 is entered. Transition 632 to state Active/Active 640 occurs when the local and remote servers elect a quorum computer with quorum GUID. The quorum computer tracks the TOKEN for this system GUID. Both the local and the remote servers also track the TOKEN based on the quorum GUID. Transition 634 and transition 635 occur when both the local and remote servers cannot connect to the same quorum computer before a timeout period expires. Transition 634 occurs to state Active/Online 660 when the local server wins the arbitration with the remote server. The local server was chosen to become active. A TOKEN is created and kept by both servers to identify the local server. Transition 635 to state Online/Active 620 occurs when the local server loses the arbitration with the remote server. The remote server was chosen to become active. A TOKEN is created and kept by both servers to identify that remote server.

Subsequent passes through state Online/Online 630 are described below.

State 640 Active/Active is the normal operational state of the system. Both local and remote servers are operational and a quorum computer is connected. There are three transitions out of this state, one for each of the three components. Transition Start 601 to state Offline/Unknown 610 represents the local server as being removed from the system by a failure or loss of communications to both the remote server and the quorum computer. Transition 641 to state Active/Unknown 650 occurs when the local server loses connection to the remote server and the elected quorum computer gives the TOKEN to the local server. Transition 642 to state Offline/Unknown 610 occurs when the local server loses connection to the remote server and the elected quorum computer gives the TOKEN to the remote server. Transition 643 to state Downgrade Pending 670 occurs when communications is lost to the quorum computer. Arbitration between the local and remote servers creates a local or remote TOKEN to be used in case connections cannot be re-established to a quorum computer. The Quorum TOKEN still exists, but it is isolated on the inaccessible quorum computer. Resolution of this duplicate TOKEN is described below. Transition 644 back to state Active/Active 640 allows the server to elect a different quorum computer without affecting the operational mode of the servers.

State Downgrade Pending 670 is a temporary active/active state. A timeout period is started on entry to the state. During the timeout interval, re-establishing communications with the elected quorum computer or electing a new quorum computer will avoid having to downgrade the computer system. Transition 673 to state Active/Active 640 occurs when communications with the elected quorum computer is re-established. The local or remote TOKEN created on entering state Downgrade Pending 670 is discarded in favor of the quorum TOKEN on the quorum computer. Transition 674 to state Active/Active 640 occurs when a new quorum computer is elected. The local or remote TOKEN is discarded and a new quorum TOKEN is created on the new quorum computer identified by the new value of quorum GUID. Note there is still an outstanding quorum TOKEN on the old quorum GUID quorum computer. Transition 671 to state Offline/Unknown occurs when the TOKEN created on the transition from state Active/Active 640 was remote and either the timeout for finding a quorum has expired, or the remote server stops communicating. Transition 672 to state Active/Unknown 650 occurs when the server TOKEN created on the transition from state Active/Active 640 was local and either the timeout for finding a quorum has expired, or the remote server stops communicating.

Returning back to state Offline/Unknown 610, there are four transitions from the state. Transition 613 was described above when describing the initial transfers of a new system. Transition 611 occurs to state Online/Active 620 when a remote server is present and the remote server has the TOKEN. Transition 612 to state Active/Unknown 650 occurs when the local server has the TOKEN. Transition 614 to state Active/Unknown 650 occurs when there is an elected quorum computer identified by quorum GUID, the elected quorum computer has the quorum TOKEN, the remote server is unavailable, and a timeout interval has expired. Then a local TOKEN is given to the local server by the quorum computer and the local server is allowed to go active.

State Online/Active 620 has the remote server operational with the local server attempting to join the system. Transition 621 to state Offline/Unknown 610 occurs when communication is lost with the remote server. Transition 622 to state Active/Active 640 occurs when the local and remote servers elect a new quorum computer. The remote TOKEN is destroyed and a new quorum TOKEN is created on the new quorum computer. Transition 623 to state Active/Active 640 occurs when the currently elected quorum computer is connected to both the local and the remote server. The remote TOKEN is given back to the quorum computer.

State Active/Unknown 650 has the local server operational with the remote server unknown. When connection to the remote server is established, transition 651 occurs to state Active/Online 660.

State Active/Online 660 has three transitions. Transition 661 to state Active/Unknown 650 occurs when communications to the remote server is lost. Transition 662 to state Active/Active 640 occurs when the local and remote servers elect a new quorum computer. The local TOKEN is destroyed and a new quorum TOKEN is created on the new quorum computer. Transition 663 to state Active/Active 640 occurs when the currently elected quorum computer is connected to both the local and the remote server. The local TOKEN is given back to the quorum computer.

After state Active/Active 640 has been visited once, there is always a currently elected quorum computer identified by quorum GUID. From state Online/Online 630, transition 633 to state Active/Active 640 can be taken when communications to the quorum computer quorum GUID is re-established. Transition 634 and transition 635 occur when neither the local server nor the remote server can connect to the same quorum computer before a timeout period expires. Transition 634 occurs to state Active/Online 660 when the local server wins the arbitration with the remote server. The local server was chosen to become active. A TOKEN is created and kept by both servers to identify the local server. Transition 635 to state Online/Active 620 occurs when the local server loses the arbitration with the remote server. The remote server is chosen to become active. A TOKEN is created and kept by both servers to identify that remote server.

Resolution of Duplicate TOKENS

At any given time there may be multiple tokens in existence for a given system GUID. The existence of multiple tokens for a given System GUID is permitted because:

1) There can be only one elected quorum computer for any system GUID. The servers in the system corresponding to the system GUID track the quorum GUID for the elected quorum computer. The quorum GUID can only change when both servers in the system GUID agree on a new quorum election.
2) A server can only get a TOKEN from the elected quorum computer or from the other server.
3) A quorum computer can only get the TOKEN when in communication with both servers of the system corresponding to the system GUID.
4) When a local or remote TOKEN is outstanding, the servers of the system corresponding to the system GUID ignore the token status of the elected quorum computer quorum GUID.

Thus, when a quorum computer is de-elected, the de-elected quorum computer is ignored by the servers of the system corresponding to the system GUID. The current state of TOKEN from the perspective of the quorum computer is unimportant and may appear to be in conflict with other quorum computers. There may be several quorum computers that believe they are the elected quorum computer for a particular system GUID. Only the servers of the system corresponding to the system GUID know which quorum computer is the elected quorum computer. When system GUID re-elects the quorum computer corresponding to the quorum GUID, the apparent conflict for that pairing is resolved. The quorum computer is given the quorum TOKEN and all local and remote tokens will be removed.

Interactions Between Quorum Computer and Servers

A sequence of interactions between server 310 and server 320 (both members of the system corresponding to the system GUID 300) and quorum computer 330 and quorum computer 340 are described to illustrate the operation of the system. Changes in the configuration are illustrated in FIG. 7.

Step 1: Boot server 310 and server 320. Both servers end in state Online/Online 630 because there is no TOKEN and no available quorum computers.

Step 2: Servers arbitrate. After a timeout period waiting for a quorum computer, the servers arbitrate the TOKEN to server 320. Server 310 ends in state Online/Active 620 because it does not have the TOKEN. Server 320 ends in state Active/Online 660 because is has the TOKEN.

Step 3: Quorum boots. Quorum computer 330 boots. There is no System GUID knowledge, so the final state is Inactive 520.

Step 4: Elect quorum computer 330. Both server 310 and server 320 discover and elect quorum computer 330. Both server 310 and server 320 end in state Active/Active 640 while the quorum computer 330 ends in state Connected 530. The Quorum GUID is 330, the System GUID is 300 (System GUID for servers 310 & 320), and the TOKEN belongs to quorum computer 330.

Step 5: Reboot the quorum computer 330. This forces both server 310 and server 320 into state Downgrade Pending 670. They arbitrate the TOKEN to server 320.

Step 6: Avoid split-brain. A timeout period has expired attempting to acquire a quorum computer. Using the TOKEN, server 310 ends in state Online/Active 620 while server 320 ends in state Active/Online 650. The quorum computer 330 has reinitialized to state Inactive 520 with no prior knowledge of any dealing with System GUID 300.

Step 7: Re-acquire Quorum. Both servers 310 and 320 connect to quorum computer 330 and give the TOKEN back. This puts both servers in state Active/Active 640. To quorum computer 330, this is an election into state Connected 530.

Step 8: Lose server 320. Server 320 stops communicating. The quorum computer 330 transitions to state Segmented 550 and gives the TOKEN to server 310. Server 310 transitions to state Active/Unknown 650.

Step 9: Lose quorum computer 330. There is no change to server 310 since it already has the TOKEN and is allowed to operate independently.

Step 10: Reboot server 310. When server 310 reboots, it transitions from state Offline/Unknown 610 to state Active/Unknown 650 because it still holds the TOKEN.

Step 11: Reboot Quorum. The quorum computer 330 ends in state Segmented 550 because the System GUID of server 310 was saved over the boot and there is only one server available. No change occurs to server 310.

Step 12: Server 320 boots. Server 320 stays in state Offline/Unknown 610 until a connection has been established to either server 310 or quorum computer 330. Note that server 310 has the TOKEN and that server 320 has no record of a TOKEN. Server 320 must either connect to quorum computer 330 and arbitrate for the token (this is shown in step 17) or connect to server 310 and arbitrate for the token.

Step 13: Server 320 connects. Server 310 and server 320 can communicate. This puts server 310 in state Active/Online 660 and server 320 in state Online/Active 620. Both servers agree on the TOKEN ownership. Quorum computer 340 has been booted to show a new election in the next step.

Step 14: Elect quorum computer 340. Both server 310 and server 320 agree to elect a new quorum computer 340. This puts both server 310 and 320 in state Active/Active 640 with the Quorum GUID set to 340. Quorum computer 330 is still in state Segmented 550 believing that it is still elected by System GUID 300. Quorum computer 320 ends in state Connected 530 with a System GUID of 300 and the TOKEN.

Step 15: Reboot both servers. Both servers are rebooted and follow the path from states Offline/Unknown 610 to Online/Online 630 because neither server has the TOKEN and both servers are present before the timeout period (transition 614). Quorum computer 340 times out the connections to System GUID 300, drops all knowledge of System GUID 300, and ends in state Inactive 520.

Step 16: Lose server 320. Server 310 ends in state Offline/Unknown 610 because it does not have a TOKEN. Quorum computer 340 is still elected quorum computer for system 300.

Step 17: Quorum & Timeout. After a timeout period waiting for server 320 to appear, server 310 arbitrates with quorum computer Quorum GUID (340) for the TOKEN. Quorum computer 340 has no prior knowledge of System GUID 300 but will create the TOKEN and give it to server 310. This leaves server 310 in state Active/Unknown 650 and quorum computer 340 in state Segmented 550. Both agree that server 310 has the TOKEN.

Step 18: Server 320 reboots. Server 320 will end in state Online/Active 620 because server 310 is present and has the TOKEN. Server 310 ends in state Active/Online 660. Quorum computer 340 stays in state Segmented 550 because server 320 has not yet connected to it.

Step 19: Server 320 returns. Both servers transition to state Active/Active when server 320 connects to quorum computer 340. Quorum computer 340 ends in state Connected 530.

Step 20: Avoid split-brain. Servers 310 and 320 can no longer communicate. Quorum computer 340 transitions to state Save GUID 540 and gives the TOKEN to server 320. Server 320 ends in state Active/Unknown 650 with the TOKEN. Server 310 ends in state Offline/Unknown 610 because it does not have the TOKEN and cannot acquire it from quorum computer 340.

Step 21: Reconnect. Servers 310 and 320 reconnect. This transitions both servers to state Active/Active 640. Quorum computer 340 transitions to state Connected 530 and gets the TOKEN back.

Step 22: Elect Quorum 330. Both servers 310 and 320 elect quorum server 330 without making any state change leaving them in state Active/Active 640. Quorum computer 330 transitions from state Segmented 550 through Save GUID 540 to state Connected 530. Quorum computer 340 ends in state Inactive 520 with no prior knowledge of System GUID 300. The System GUID and Quorum GUID for servers 310, 320 and quorum computer 330 are now consistent.

Techniques have been described for ensuring that a replicated system cannot operate in split-brain mode. A floating (selectable from a dynamic pool of available computers) quorum computer may be used to arbitrate between the replicated components when direct communication is lost. The ability to reboot the systems and still avoid split-brain operation in the presence of failures is provided with the addition of a token. Token coordination is maintained across system failures, reboots, and quorum computer changes.

Implementations of the techniques may include a method or process, a system or apparatus, or computer software on a computer-accessible medium. Other implementations are within the scope of the following claims.

What is claimed is:

1. A method of operating a fault-tolerant computer system, the method comprising:

having each server of a fault tolerant computer system that includes at least a first server, a first link between the first server and a network, a second server, and a second link between the second server and the network, with each of the first and second servers being configured to perform a first set of operations and to communicate with a computer that does not perform the first set of operations through the network, and in the event of a failure of the first server, the second server, the first link or the second link, determining which of the first and second servers will continue to perform the first set of operations by:

if the first server and the second server are able to communicate with one another over the first link and the second link, having the first server and second server communicate to determine which of the first and second servers will continue to perform the first set of operations, and if the first server and the second server are not able to communicate with one another over the first link and the second link, having the computer that does not perform the first set of operations communicate with the first and second servers to determine which of the first and second servers will continue to perform the first set of operations.

2. The method of claim 1 wherein determining which of the first and second servers will continue to perform the first set of operations comprises having one of the first and second servers that is able to communicate after the failure continue to perform the first set of operations.

3. The method of claim 2 wherein determining which of the first and second servers will continue to perform the first set of operations comprises having one of the first and second servers that is unable to communicate with the computer after the failure cease performance of the first set of operations.

4. The method of claim 1 further comprising determining which of the first and second servers will cease performance of the first set of operations in the event of the failure.

5. The method of claim 4 wherein determining which of the first and second servers will cease performance of the first set of operations comprises having one of the first and second servers that is unable to communicate with the computer after the failure cease performance of the first set of operations.

6. The method of claim 1 wherein determining which of the first and second servers will continue to perform the first set of operations based on communication with the computer farther comprises avoiding split-brain operation by having the first server continue to perform the first set of operations and having the second server cease performance of the first set of operations in the event of a failure of the second link.

7. The method of claim 1 wherein the computer is connected to the network by a third link.

8. The method of claim 1 further comprising having the first and second servers select the computer that does not perform the first set of operations from multiple computers that do not perform the first set of operations.

9. The method of claim 8 wherein the computer that does not perform the first set of operations has a unique identifier.

10. The method of claim 8 wherein the computer that does not perform the first set of operations is configured to communicate with multiple fault tolerant computer systems.

11. The method of claim 10 wherein each of the multiple fault tolerant computer systems has a unique identifier.

12. The method of claim 8 further comprising, after the first and second servers select the computer that does not perform the first set of operations, providing a first server with a token that permits the first server to operate independently of the computer and a second server.

13. The method of claim 12 wherein providing the first sewer with the token comprises doing so only when the first server and the second server can communicate with each other.

14. The method of claim 12 farther comprising having the computer provide the first sewer with the token.

15. The method of claim 14 further comprising having the computer determine which of the first server and the second server has a higher level of functionality and providing the first server with the token when the first server has the higher level of functionality.

16. The method of claim 14 farther comprising having the computer determine whether the first server and the second server have network connections to the computer and providing the first server with the token when the first server has a network connection to the computer and the second server does not have a network connection to the computer.

17. The method of claim 8 wherein having the first and second servers select the computer that does not perform the first set of operations comprises doing so only when the first server and the second server can communicate with each other.

18. The method of claim 1 wherein determining which of the first and second servers will continue to perform the first set of operations comprises determining that the first server will continue to perform the first set of operations when the first server has a higher level of functionality than the second server.

19. The method of claim 1 further comprising providing a token to the determined one of the first and second servers which will continue to perform the first set of operations, wherein the token permits the determined one of the first and second servers to operate independently of the computer and the other one of the first and second servers.

20. The method of claim 19 wherein the token permits the determined one of the first and second servers to reboot or power up.

21. A fault-tolerant computer system comprising:

a first server configured to perform a first set of operations and having a network connection to a computer that does not perform the first set of operations, and a second server configured to perform the first set of operations and having a network connection to the first server and to the computer, wherein the system is configured to determine, in the event of a failure of a component of the system, which of the servers will continue to perform the first set of operations by:

if the first server and the second sewer are able to communicate directly with one another, having the first server and the second server communicate to determine which of the first and second servers will continue to perform the first set of operations, and if the first server and the second server are not able to communicate directly with one another, having the computer that does not perform the first set of operations communicate with the first and second servers to determine which of the first and second servers will continue to perform the first set of operations.

22. Computer software, stored on a computer-readable medium, comprising instructions, when executed, cause a fault-tolerant computer system to:
- have each server of the fault tolerant computer system, which includes at least a first server, a first link between the first server and a network, a second server, and a second link between the second server and the network, with each of the first and second servers being configured to perform a first set of operations and to communicate with a computer that does not perform the first set of operations through the network, and
- in the event of a failure of the first server, the second server, the first link or the second link, determine which of the first and second servers will continue to perform the first set of operations comprises:
  - if the first server and the second server are able to communicate with one another over the first link and the second link, having the first server and second server communicate to determine which of the first and second servers will continue to perform the first set of operations, and
  - if the first server and the second server are not able to communicate with one another over the first link and the second link, having the computer that does not perform the first set of operations communicate with the first and second servers to determine which of the first and second servers will continue to perform the first set of operations.

* * * * *